United States Patent [19]

Bonn et al.

[11] 4,407,355

[45] Oct. 4, 1983

[54] METHOD AND APPARATUS FOR DECREASING THE HEAT AND MATERIAL EXCHANGE IN THE DIRECT VICINITY OF THE WALLS OF FLUIDIZED BED REACTORS

[75] Inventors: Berhard Bonn, Essen; Franz Giertz, Ratingen; Lothar Holl, Essen; Heinz Schreckenberg, Brilon, all of Fed. Rep. of Germany

[73] Assignee: Bergwerksverband GmbH, Essen, Fed. Rep. of Germany

[21] Appl. No.: 242,127

[22] Filed: Mar. 9, 1981

[30] Foreign Application Priority Data

Mar. 11, 1980 [DE] Fed. Rep. of Germany ....... 3009198

[51] Int. Cl.$^3$ .............................................. F28D 13/00
[52] U.S. Cl. .............................. 165/104.16; 122/4 D; 34/57 A; 422/146; 422/143
[58] Field of Search ............... 432/139, 142, 143, 146, 432/197; 110/245; 122/4 D; 34/57 A; 432/197; 165/104.16

[56] References Cited

U.S. PATENT DOCUMENTS

| | | | |
|---|---|---|---|
| 2,750,681 | 6/1956 | Berry | 422/139 X |
| 3,645,700 | 2/1972 | Nagamura | 165/104.16 X |
| 3,783,528 | 1/1974 | Sheely | 34/57 A |
| 4,096,909 | 6/1978 | Jukkola | 165/104.16 |

*Primary Examiner*—Albert W. Davis, Jr.
*Attorney, Agent, or Firm*—Michael J. Striker

[57] ABSTRACT

In a method for decreasing the heat, impulse and material exchange in the direct vicinity of the walls of fluidized bed reactors, the flow resistance to the fluid (agitating medium) conducted through the fluidized bed will be increased in the vicinity of the walls to such an extent that the fluidized bed does not do much agitating in this region; moreover the components sticking out of the interior walls of the reactor serve to extend the rib-shapes from the wall projecting into the reaction space or parallel to the reactor wall while forming a slit with the latter. The components can be pre-fabricated segments and the distance of the annular components in the direction of flow of the fluid should at most be about half as great as the height of the ribs lateral thereto.

3 Claims, 1 Drawing Figure

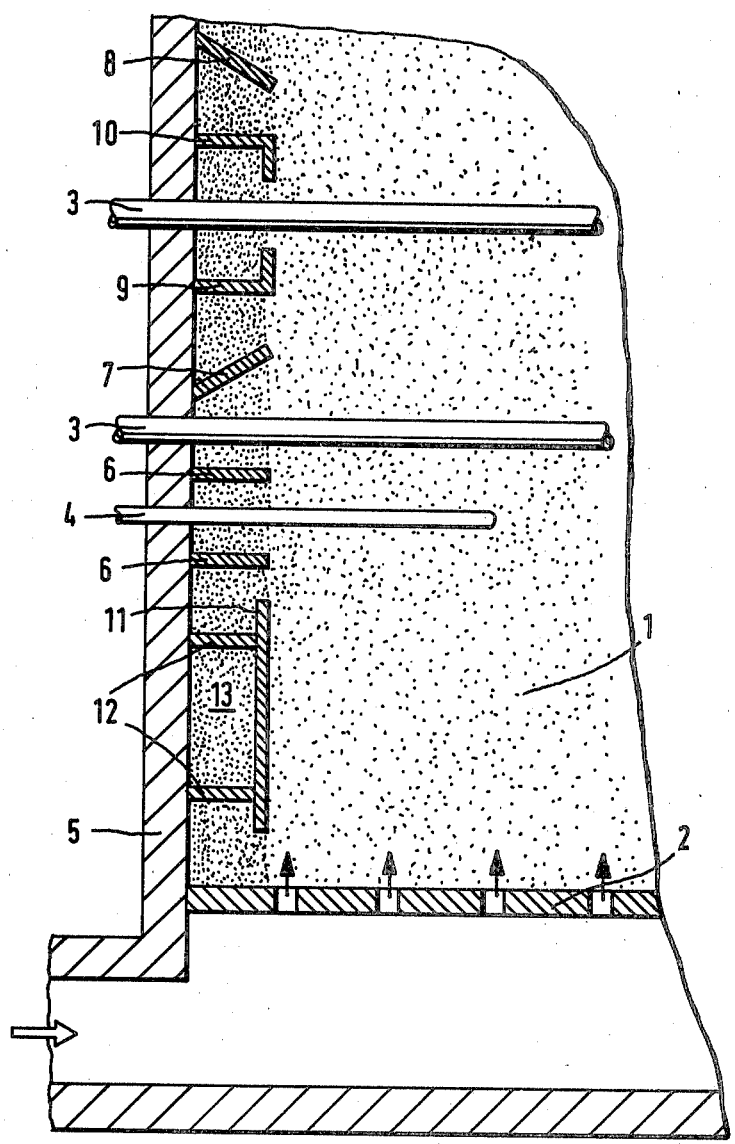

METHOD AND APPARATUS FOR DECREASING THE HEAT AND MATERIAL EXCHANGE IN THE DIRECT VICINITY OF THE WALLS OF FLUIDIZED BED REACTORS

BACKGROUND OF THE INVENTION

The invention concerns a method and apparatus for decreasing the heat, material and impulse exchange in the direct vicinity of the walls of fluidized bed reactors, in which a granulated solid is fluidized by a fluid from below and thereby is given an intensive agitated movement (fluidized bed).

The decrease in the heat, material and impulse exchange is frequently desirable in e.g. chemical reactors or combustion chambers for reducing the loss of heat and also to protect the walls if necessary simultaneously from corrosive and erosive stress.

As a result of the intensive movement of solids the fluidized beds produce e.g. an extraordinary heat transferring capacity. The heat transfer coefficients at the boundary of the fluidized bed are for instance about an order of magnitude higher than with heat exchangers, which only act upon gases (M. Baerns, *Chem. Ing. Techn.* 40 (1968) 737). This usually thoroughly desired characteristic can in many cases of use or in known phases of operation lead to undesirably high leakage of heat through the reactor walls. Also, the material exchange will be considerably promoted through the agitation of the solids, so that mixing of the solids in fluidized bed reactors can be introduced easily and lead to very homogeneous products.

To decrease undesirably high leakage of heat through the walls and/or corrosive and erosive attack, ceramic linings, e.g., through tamping or lining with bricks or masonry, are customary (Lueger, *Encyclopedia of Technology*, Fourth Edition (1965) volume 7, p. 266, Stuttgart). The peculiarity of the lining, however, necessitates that the number of passages extending through the wall must be kept as small as possible because of the increased susceptibility of the lining to breakdown where such passages exist. With fluidized bed reactors with higher thermal loading of the reaction space, such as e.g. heavy-duty combustion chambers, they must however be cooled through an immersed heat exchanger, so as to be able to regulate the reaction temperature. In this case a brick lining in the wall is inappropriate on account of the many passages; for this reason water wall panels are used to a greater extent, in which passages are produced easily and they have a sufficient strength. The increased leakage of heat through the cooled walls must, however, be accepted with this construction (E. Wied, *Steam Generator with Fluidized Bed Combustion Under Atmospheric and Above Atmospheric Conditions*, VGB Kraftwerkstechn. 58 (1978), [8] 554). In particular with heating up of the fluidized bed reactors one obtains such an effect that disproportionately large amounts of start-up heat become necessary, which, usually, must be introduced through extraneous energy.

A tamping of the reactor with a thermally insulating material results only in a comparatively small effectiveness, since through the large number of fastening rivets the heat transfer coefficient will only be reduced insignificantly. In addition, the durability of the tamped lining is, in the region where many passages exist as it is necessary for heat exchange bundles, very limited, and damages are removed only at great expenditure. This obtains also if a lining not for heat insulation purposes but for protection from corrosive and erosive strain must be applied. (W. Gumz, *Brief Handbook of Fuel and Heating Technology*, Third Edition, pp. 600–603, Berlin, Gottingen, Heidelberg, 1962; *Koppers Handbook of Fuel Technology*, Third Edition, p. 363, Essen).

SUMMARY OF THE INVENTION

The invention is therefore based upon the object of overcoming the mentioned disadvantages, without altering substantially the favorable characteristics of the fluidized bed. In particular, the passage of heat through the reactor walls as well as the material and impulse exchange in the neighborhood of the walls should be decreased considerably.

It has been demonstrated that this object is solved according to the present invention in a surprisingly simple and technically progressive manner, when namely the flow resistance to the fluid in proximity to the walls is increased to the extent that the fluidized bed in this region will not be fluidized. This can be realized for example by bringing components into the reactor apparatus, which stand out from the reactor walls. These components are according to the invention preferably in the shape of ribs with a preferred horizontal extension. In order to particularly thwart the agitation in the proximity of the walls, the distance of the ribs in the direction of fluid flow is according to the invention at most about half as large as the height of the ribs transverse thereto. The ribs can not only stand out perpendicularly from the wall but also be inclined. The components can according to the invention also be disposed parallel to the reactor walls and from a slit with them, the width of which depends among other factors on the desired insulating effect.

The components according to the invention can according to an improvement of the invention be brought in as segments, which diminishes the thermal stress on the material and simplifies the assembly and possible storage of such ribs and makes possible a pre-fabrication in addition to the later incorporation of supplementary components.

According to the invention components can be fastened to the inner wall of the reactor by welding, screwing, gluing or similar techniques. In each case they offer the advantage of a certain reinforcing of the reactor walls, and their use can therefore diminish the material dimensions and/or former reinforcements necessary, which are customary with thermally loaded reactors. In so far as such components are concerned which are disposed parallel to the reactor wall and form with it a slit, it can be advantageous to give them e.g. a scale structure to stabilize against heat distortion. This latter is recommended above all for the components in question when they consist of somewhat curved metal sheets corresponding to the shape of the reactor.

It has been shown that the insulating effect of the components according to the invention is all the greater, the wider the slits are or the farther the ribs project into the space of the reactor.

Through components of this kind the flow resistance for the fluid in the direct proximity of the walls will be increased so extensively that the agitating movement of the solids, through which the good heat and material exchange is effected in fluidized beds, is eliminated in the border zone. This result is surprising so far the fluid-like fluidized bed as flows freely around the components not near the border, e.g. heat exchanger tubes. (*Fluidization,* J. F. Davidson, D. H. Harrison (eds.), London and New York (1971), e.g. Chapter 11).

It is of particular advantage with the described method that for the protection of the walls or for heat insulation of the fluidized bed reactor the fluidized material alone is used. Thereby no expensive tamping or similar technique is necessary; but by filling up the reactor with bed material and the following fluidization, develops automatically the protecting layer in the calm zone. Moreover the material flows from the calm zone with draining of the reactor contents, perhaps with shutdown of the apparatus, and leaves the walls e.g. free for inspection.

If the flow resistance in the region near the walls is increased through components, in particular the components brought parallel to the wall allow the bed material to flow completely from the calm zone with draining, while rib-shaped components furnish particularly good accessibility to the walls after the draining of the bed material and can also run e.g. between the row of tubes of a heat-exchange bundle without difficulty. By inclining, etc., of the ribs one obtains particular effects, e.g., complete running off of the bed material upon emptying out of the reactor or also conversely a retention of particularly large amounts of bed material near the walls even after emptying of the reactor.

A further advantage is that one need not take into consideration the resistance to sudden changes in temperature of brick or masonry linings or tamped linings. That is, one can irrespective of the protection components optionally quickly heat up the reactor or allow it to cool down.

Since the calm zone near the walls does not participate in the agitated movement, there results there also a strongly inhibited material exchange with the fluidized core zone of the reactor. This is of advantage with reactions using corrosion-promoting reaction participants, for protecting the walls of the reactor, and also with reactions having stronger evolution of heat, since in the calm zone consequently not only the coefficient of heat transfer is reduced but also no or only a more strongly decreased reaction occurs. Furthermore, a possibly erosive strain occurs only to the more easily replaceable components, whereas the real reactor wall will be protected by the calm zone.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

With the aid of the drawing an apparatus (horizontal section) for accomplishing the method according to the invention is more closely illustrated only by way of example. The FIGURE shows the arrangement and different shapes for the components that prevent fluidized movement for realization of a calm zone in the proximity of the walls of the reactor.

DESCRIPTION OF THE PREFERRED EMBODIMENTS

According to the FIGURE—enlarged section of a common fluidized bed reactor—the latter is charged with solids (fluidized material) 1, which will be agitated from below with the fluid (gas or liquid) entering through the distributor plate 2. The intensive movement of solids, which is cause for the good material and heat exchange inside the bed and from the bed to the wall, will for example through components 6–11 be reduced to such an extent in the direct vicinity of the walls that not much fluidized movement will appear and, as a result of this, material and heat exchange will be strongly decreased. If in the bed e.g. heat exchange tubes 3 or measuring probes 4 or similar components are found, they are introduced through the reactor wall so that the fluidized movement retarding components 6–10 can be e.g. advantageously formed in the shape of ribs. Thereby the passages can be laid in the intermediate space between the ribs, which leads to a particularly simple construction. The components sticking out of the fluidized bed reactor wall 5 can either be upright, 6, or inclined, 7 and 8, bent towards above, 9, or below, 10, or also disposed parallel, 11, to reactor wall 5. In the last case they can for example be steadied by spacing supports 12, which can be introduced, so that they additionally prevent the movement of the solids. In this manner a slit 13 is formed with the interior wall of the reactor.

EXAMPLE 1

In a model fluidized bed reactor (length 400 mm, width 500 mm, height 800 mm) the effectiveness of the invention was demonstrated in the following manner:

As components ribs (according to the Figure, reference numerals 6—10) of about 80 mm height and mutually spaced about 40 mm were selected, which were placed substantially perpendicular to the interior wall of the reactor. Between the components tubes were introduced through the wall, as represented in the Figure; sand was the fluidized material. The components were only brought into one side of the rectangular model reactor, the walls of which were composed of Plexiglass. With the agitation of the sand it was clearly shown that in the walls without the components intensive movement of solids, also around the tubes introduced through the wall, took place, but in the region of the components according to the invention the sand was completely at rest.

EXAMPLE 2

In a fluidized bed fuel combustion chamber (length 400 mm, width 800 mm, fluidized bed height 1000 mm) with a side wall (800 mm) cooled for the purpose of investigation, different components were brought in for tests in front of the cooled surface at a distance of about 50 mm parallel to it, which impeded the agitation and thereby must have reduced the heat leakage across the cooled wall. It was demonstrated that with heating tests using carbon-containing fluidized material in this combustion chamber under otherwise completely similar conditions only about half the time was needed to attain an operational temperature of about 850° C., than during operation of this combustion chamber without the components. From this result it may be concluded that the passage of heat in the cooled wall was decreased by more than about 30% by the impediment to the agitation in the proximity of the wall.

It will be understood that each of the elements described above, or two or more together, may also find a useful application in other types of reactors differing from the types described above.

While the invention has been illustrated and described as embodied in a method and apparatus for decreasing the heat and material exchange in the direct vicinity of the walls of fluidized bed reactors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Apparatus for decreasing the heat, impulse and material exchange in the direct proximity of the walls of a fluidized bed reactor, comprising rib-shaped sheetlike components with a preferred horizontal extension sticking out of the interior reactor walls and operative for increasing resistance to flow of the fluid conducted through the fluidized bed in the vicinity of the walls so that whirls in said proximity of the walls are avoided, wherein the distance of the components away from said interior wall in the direction of flow of the fluid is at most about half as great as the height of said components, lateral thereto, and wherein for the protection of the walls or for heat insulation of the fluidized bed reactor, the fluidized material is used.

2. Apparatus for decreasing the heat, impulse and material exchange in the direct proximity of the walls of a fluidized bed reactor, comprising rib-shaped sheetlike components with a preferred horizontal extension sticking out of the interior reactor walls and operative for increasing resistance to flow of the fluid conducted through the fluidized bed in the vicinity of the walls so that whirls in said proximity of the walls are avoided, wherein the components are disposed parallel to the reactor wall and form with it a slit, and wherein for the protection of the walls or for heat insulation of the fluidized bed reactor, the fluidized material is used.

3. Apparatus according to claim 2, wherein the components are mounted in segments.

* * * * *